April 4, 1972   W. A. BLACKBURN ET AL   3,654,063
CARPET UNDERPAD COMPOSITE
Filed April 9, 1970

INVENTORS
WILLIAM A. BLACKBURN
PHILIP J. STEVENSON
BY
J. Bowen Ross, Jr.
ATTORNEY

United States Patent Office 3,654,063
Patented Apr. 4, 1972

3,654,063
CARPET UNDERPAD COMPOSITE
William A. Blackburn, Chapel Hill, and Philip J. Stevenson, Durham, N.C., assignors to Monsanto Company, St. Louis, Mo.
Filed Apr. 9, 1970, Ser. No. 27,003
Int. Cl. B32b 1/00, 3/00
U.S. Cl. 161—125                            10 Claims

ABSTRACT OF THE DISCLOSURE

A high tear strength sponge rubber carpet underpad composite comprised of a layer of sponge or blown elastomer which preferably has a plurality of formed bulges or patterned contours and a spunbonded non-woven fabric embedded in the elastomer to a depth less than the fabric thickness, the fabric consisting of continuous nylon filaments which are free of sizing coatings, lubricants, etc., and which have etched surfaces, the filaments being autogenously bonded together at a substantial number of touching cross-over points.

BACKGROUND OF THE INVENTION

(1) Field of the invention

This invention relates to an improved carpet underlay composite, and more particularly, to a carpet underpad consisting of a layer of sponge rubber and a reinforcing layer of spunbonded non-woven fabric, the two layers being adhered together along their contiguous surfaces.

(2) Description of the prior art

This invention is concerned with the carpet underlay of the type generally shown in U.S. Pats. 2,740,739 to Harwin et al. and 3,455,772 to Mason et al. The Harwin et al. patent discloses an underlay which consists of a configurated blown rubber layer reinforced on one side with a scrim of a relatively open mesh woven fabric. The scrim was placed on the sponge rubber layer during the blowing of the rubber so that portions of the sponge rubber would penetrate through the scrim and mechanically lock the same in place. Although the cost of such a carpet underlay is quite low, it suffers from the disadvantages of scrim delamination resulting from poor bonding between the foam rubber and the scrim, high surface friction due to the penetration of the rubber through the scrim, low strength except in the warp and fill directions of the scrim and low tear strength.

The non-woven reinforced rubber underpad as disclosed in the patent to Mason et al. is comprised of a latex saturated non-woven fabric having at least one smooth and densified surface consisting of staple fibers bonded together by a fusible thermoplastic binder and a sponge elastomer layer to which the smooth and densified surface side of the fabric is chemically bonded. It was stated that the fused thermoplastic binder was compatible with the rubber whereby the bond strength between the fabric and the rubber was greater than the internal cohesiveness of the rubber. The Mason et al. underpad suffers from several disadvantages. The reinforcing fabric is comprised of staple fibers; thus, the fabric weight must be increased to achieve the desired tensile and tear properties and a large number of staple fiber ends will appear on the exposed side of the fabric which results in an increased frictional drag of carpets thereacross. Also, the fusible thermoplastic binder used for bonding the filaments limits the application of the fabric to the melting point of the thermoplastic binder which for many rubber coating processes is below that of the rubber processing temperatures.

SUMMARY OF THE INVENTION

This invention is a composite structure comprised of a spunbonded non-woven fabric lamina and a blown sponge elastomer lamina which are bonded together along their contiguous surfaces by the fabric lamina being embedded in the elastomer lamina to a depth not greater than the fabric thickness. The non-woven fabric lamina is comprised of continuous nylon filaments which are arranged within the plane of the fabric without apparent order. The nylon filaments do not have a lubricant coating or other type of finish but do present etched surfaces which aids in the mechanical bonding of the fabric to the foamed elastomer. The nylon filaments comprising the fabric lamina are autogenously bonded together at a substantial number of touching filament cross-over points to provide multi-directional dimensional stability. "Autogenously bonded" means that the bonds are formed in the absence of an external binder. For example, two synthetic fibers may be autogenously bonded together by the application of heat in that the fibers are fused together at the crossover points. Autogenously bonding also includes the use of solvents since that upon the removal of the solvent from the fibers, the polymers comprising the touching fibers are mixed at the fiber cross-over points. However, the preferred method for autogenously bonding nylon fibers is by the use of a hydrogen halide gas and, more specifically, hydrogen chloride gas. The fibers absorb the hydrogen chloride gas along the surface areas which results in the braking of the intermolecular hydrogen bond between adjacent amide groups. Upon desorbing the HCl gas from the nylon fiber, the intermolecular hydrogen bond between amide groups of different fibers reform thus resulting in bonding at the interfilament cross-over points. As a by-product of bonding with HCl gas, the HCl gas etches the surface of the nylon filaments to increase substantially the surface area of the same. The increased surface area greatly aids the mechanical bonding between the filaments and the elastomer. Without etching the surface of the filaments, the elastomer does not readily adhere to synthetic filaments because of their very smooth surfaces, the surfaces being glass-like in appearance under a microscope. It has been found that by providing the filaments with etched surfaces, the bond strength between the elastomer layer and the fabric layer is greater than the internal cohesiveness of the elastomer.

The elastomer used to form the sponge lamina may be of any conventionally known type such as natural, synthetic (styrene-butadiene) or reclaimed rubber. The sponge rubber after blowing can have a blown density in the range from 1 to 40 lbs./ft.$^3$. The blowing of the elastomer can be accomplished by any technique suited to the particular elastomer system being used. To increase resilience, the sponge rubber will most likely assume an egg-crate shape which is comprised of a plurality of formed bulges to which the fabric lamina is adhered. Since the nylon fabric lamina presents a very slick exposed surface which greatly reduces the frictional drag of a carpet being pulled thereacross, it is important that the elastomer not penetrate completely through the fabric and reduce the efficacy of the fabric. Therefore, the fabric lamina is embedded in the elastomer lamina to a fabric depth which is less than the fabric thickness.

The nylon fabric lamina of this invention generally weighs less than 1 oz./yd.$^2$ for the reasons that adequate strength can, for example, be achieved with fabric weight in the range of 0.6 oz./yd.$^2$. As the weight of the fabric increases beyond 1 oz./yd.$^2$, the fabric becomes increasingly stiffer which detracts from the resiliency supplied by the elastomer lamina.

Therefore, an object of this invention is to provide a non-woven reinforced blown rubber underpad which is exceptionally strong per unit weight and which has a low coefficient of friction across its exposed surface.

Another object of this invention is to provide a rubber underpad comprised of a non-woven fabric lamina and a blown rubber lamina with the fabric lamina being bonded to the rubber lamina such that the interface bond strength is greater than the internal cohesiveness of the rubber lamina.

Another object of this invention is to provide a non-woven reinforcing fabric for a blown and shaped rubber underpad which is vermin-proof, moth-proof, rot-resistant and non-allergenic.

These and other objects of this invention will become apparent when the detailed description is read in conjunction with the drawings, in which:

DETAILED DESCRIPTION OF THE PREFERRED EMBODIMENTS

Figure 1:
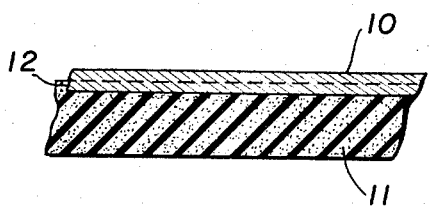
FIG. 1 is a view in cross-section of the composite showing the fabric lamina embedded to a depth less than the fabric thickness in an elastomer lamina.

While other nylons may be used to form the spunbonded non-woven fabric of this invention, the nylon subsequently referred to is nylon 6,6 which is prepared by condensing hexamethylene adipamide and adipic acid. Spun-bonded non-woven fabrics may be made by many processes, one of which being set forth in U.S. Pat. 3,338,992. A melt extruder is used for spinning continuous nylon filaments. The formed filaments are drawn downwardly away from the extruder by an aspirator which also deposits the filaments by means of moving air on a conveyor belt. The nylon filaments comprising the fabric are bonded together at a substantial number of filament crossover points by being passed through a chamber containing an activating gas, such as hydrogen chloride. The nylon filaments absorb the hydrogen chloride which renders them bondable upon the removal of the gas therefrom. Thus, the filaments are permanently bonded together at their touching crossover points by desorbing the gas from the filaments by either being subjected to heat or by being passed through a water bath. While the web just described is comprised completely of nylon filament, other continuous filaments may be incorporated into the web or fabric such as, for example, polyester, polypropylene, polyethylene, cellulose acetate or acrylic. Since the hydrogen chloride gas does not etch the surface of the other mentioned polymer filaments, a decrease in adhesion between the fabric and the rubber will be experienced when the ratio of the number of other filaments to the number of nylon filaments is increased. Thus, to fully illustrate this invention, the spunbonded non-woven fabric as described herein is comprised wholly of nylon filament.

The sponge rubber layer contains about 20% of either synthetic or natural rubber. Fillers most frequently used are clays or calcium carbonate. The rubber blowing agents are either sodium bicarbonate or thermally activated di-azo compounds or mixtures. A typical di-azo compound is azo bis(dicarbonamide). The accelerator used is generally thiuram disulfide derivatives and the curing agent may be sulfur and zinc oxide. The plasticizers are normally petroleum fractions having viscosities in the range of 500 to 1500 cps. The recipe may include other additives for special purposes including petrolatums and polyethylene oxide addition products. Various rubber recipes are disclosed in bulletin TF–52, published by the Chemical Division, Goodyear Tire & Rubber Co., Akron, Ohio.

A commonly used procedure for processing the rubber recipe includes a short mixing cycle of the rubber and a portion of the plasticizer in a Banbury followed by the addition of the remaining components in a second Banbury mixing cycle. The masticated rubber is then dropped through a two roll rubber mill and is milled to form a uniform mixture. A second roll mill provides final mixing before transfer to a three roll calender. The calender reduces the rubber sheet to a final thickness. The calendered rubber is then laid on a patterned wire belt and the spun-bonded fabric is joined onto the exposed surface of the rubber which is then placed in an oven heated from 350 to 420° F. The layered structure remains in the oven for from two to five minutes. In the oven, the unsupported rubber drapes away from the fabric into the openings in the patterned wire belt and the supported rubber portions form the mentioned bulges. Subsequently, the blowing agent decomposes and the rubber expands. Lastly, the curing of the rubber is completed.

Figure 3:
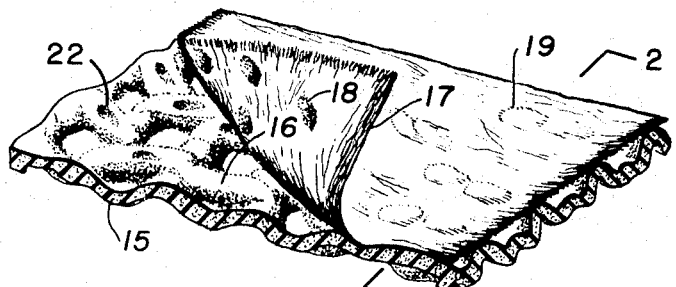
FIG. 3 is a perspective view of the carpet underlay of this invention with one corner of the fabric turned back to show the reinforcing non-woven fabric being stripped from the elastomer lamina and showing portions of the elastomer clinging to the non-woven fabric as a result of failure within the rubber.
Figure 4:
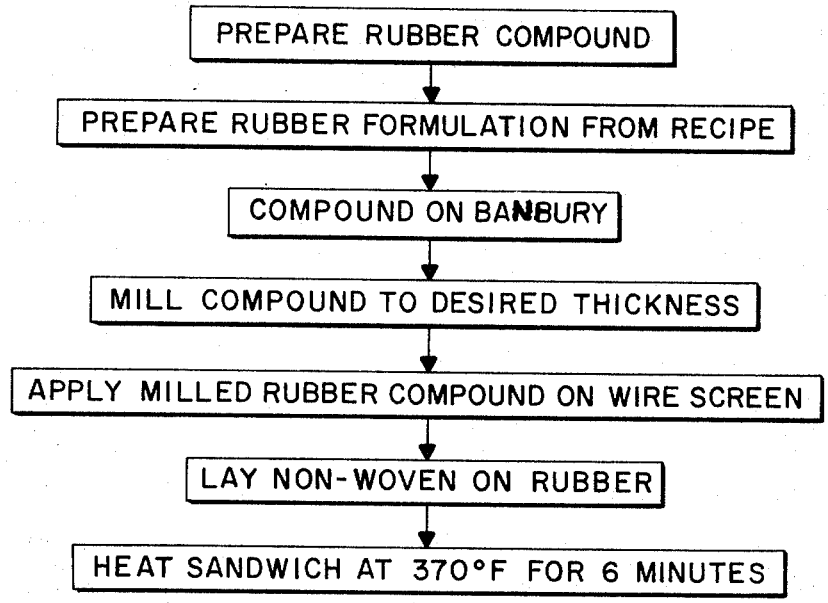
FIG. 4 is a block diagram illustrating the process of this invention.

With reference to the fabric-to-rubber bond, the high filament surface area resulting from the filaments being treated with hydrogen chloride gas and the large free volume of the fabric combine to provide extraordinary adhesion between the spunbonded fabric and the rubber pad. Referring to FIG. 3, adhesion between the rubber pad and the fabric is so great that when failure occurs, it occurs in the rubber. In FIG. 3, rubber pad 15 is bonded to the spunbonded fabric 17 at contact areas 19 along the tips of bulges 16. When peeling fabric 17 from rubber pad 15 the failure occurs within the rubber pad 15 leaving rubber fragments 18 on fabric 17 and pits 22 in bulges 16. By way of comparison, the peel strength of the fabric represented in FIG. 3 was approximately 250 grams per inch of width. Peel strength was measured in accordance with ASTM D–903–49. A similar spunbonded fabric comprised of polyester fibers was peeled in the same manner and was found to have a peel strength of 40 grams per inch of width. Conventional woven cotton fabric was found to have a peel strength of only 29 grams per inch of width. Further, the polyester and cotton fabrics failed at the rubber-fabric interface.

Figure 2:
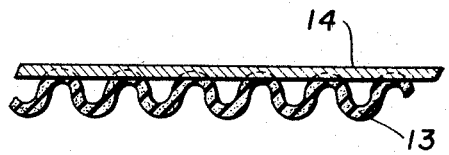
FIG. 2 is a view in cross-section taken along lines 2—2 of FIG. 3 showing the fabric lamina being bonded to the fabric only along the peaks of the elastomer lamina bulges.

The exceptional adhesion of nylon spunbonded fabric to rubber permits the reduction in the overall contact area between the fabric and the rubber which provides for a higher percentage of rubber to be available for large bulge or knuckle formation thereby increasing the thickness, resiliency and comfort of the underpad. Since high adhesion is present, the fabric need be only partially penetrated by the rubber which provides for a smooth exposed fabric surface free of any rubber strike-through. In FIG. 1, a nylon spunbonded fabric 10 is shown which is bonded to rubber pad 11 to a fabric depth as represented by the numeral 12. FIG. 2 shows rubber pad 13 assuming the common knuckle formation with nylon spunbonded fabric 14 bonded thereto. Both figures illustrate the exposed surfaces of fabrics 10 and 14 being free of rubber strike-through.

EXAMPLE 1

The nylon spunbonded fabric was produced from nylon 6,6 polymer having a relative viscosity of 38. The flake was fed to two melt screw extruders each having 1 inch diameter by 21 inch length screws operating at a temperature of 320° C. and being driven at a rotational speed of 40 r.p.m.'s. Each screw supplied molten nylon to two melt pump blocks which were fitted with gear-type metering pumps. Each melt pump block was provided with a spinnerette pack containing a spinnerette of 10 orifices, the orifices having diameters of 9 mils and capillary length of 12 mils. The pump blocks were maintained at a temperature of 315° C. while the spinnerettes were at a temperature of 262° C. The extrusion rate of the molten polymer from the spinnerette orifices was 0.75 gram per orifice.

The plurality of continuous filaments were equally divided and were forwarded to and through five air aspirators which were supplied air at a pressure of 60 p.s.i.g. The aspirators were mounted in an aligned array which was transverse to the direction of travel of the laydown belt. The attenuated filaments were forwarded from the aspirators to the laydown belt by means of the air exhausting the aspirators whereupon the filaments were deposited as a continuous web having a width of 18 inches on the laydown belt. The laydown belt had a surface speed of five feet per minute.

The fibrous web was continuously forwarded, by means of the laydown belt to and through a chamber which was supplied hydrogen chloride gas, the bonding adjuvant, at a rate of 6.5 grams per minute. The hydrogen chloride gas functioned to soften the surface of the filaments. The filaments were subsequently compacted together while in the softened state with touching filaments being subsequently bonded together upon the removal of the hydrogen chloride gas. Desorption was accomplished by exposing the web to a water bath. The desorption of the hydrogen chloride gas from the filaments by water treatment also etched the filament surfaces.

Physical testing of the nylon spunbonded fabric shows the fabric having a thickness of about 5 mils and a weight of about 0.6 oz./yd.$^2$. The strength of the fabric was tested by the strip tenacity method and resulted in the fabric having a strip tenacity of 9.3 lbs./in./oz./yd.$^2$ in the machine direction and 6.5 lbs./in./oz./yd.$^2$ in the direction being transverse from the machine direction. The rubber recipe was formulated by preparing part A, preparing part B then mixing part B with part A as follows.

| Part A: | Parts by wt. |
|---|---|
| Styrene-butadiene rubber | 125.00 |
| Zinc oxide | 6.25 |
| Calcium carbonate | 230.00 |
| Mineral oil | 70.00 |
| Sulfur | 4.25 |
| Petrolatum | 12.50 |
| Carbowax | 0.25 |
| Total | 448.25 |

Part A was mixed during a short mixing cycle in the Banbury.

Part B was prepared by mixing.

| Part B: | Parts by wt. |
|---|---|
| Sodium bicarbonate emulsion | 17.50 |
| Rubber grade sodium bicarbonate | 10.00 |
| Tetramethyl thiuram disulfide | 2.50 |
| Total | 30.00 |

Part B was likewise mixed on a Banbury and was then added to part A with the total being masticated thoroughly to form a uniform mixture. The mixture was then calendered into a rubber sheet whose thickness was adjusted to be 50 mils which produced a sponge foam with the approximate weight of 50 oz./yd.$^2$.

The calendered rubber was then transferred to a patterned wire belt and the spunbonded nylon fabric was layed on the top side of the rubber sheet. The composite was placed into an oven heated to a temperature of 400° F. The composite was allowed to remain in the oven for two and one-half minutes during which time the rubber draped to assume the pattern of the wire belt. The blowing agent decomposed which caused expansion of the rubber and the tip portions of the rubber bulges adhered to the spunbonded fabric.

The fabric-rubber composite while on the wire belt was withdrawn from the oven and was allowed to cool whereupon the composite was removed from the belt to form the carpet underlay of this invention. The peel strength of the fabric from the rubber was 255 grams per inch of width.

EXAMPLE 2

The procedure set forth in Example 1 was repeated with the exception that natural rubber was substituted for the styrene-butadiene copolymer rubber. The natural rubber composition acting similarly to the synthetic resin rubber composition and was processed in the same way to produce substantially the same result. The peel strength of the fabric from the natural rubber backing was 245 grams per inch of width.

We claim:

1. A composite comprised of non-woven fabric and blown sponge elastomer laminar being bonded together along their contiguous surfaces by said fabric laminar being embedded to a depth less than the fabric thickness in said elastomer laminar, said non-woven fabric comprised of continuous nylon filaments arranged within the plane of said fabric without apparent order, said nylon filaments being provided with etched surfaces to facilitate the bonding of the fabric laminar to the elastomer laminar and being autogeneously bonded together at a substantial number of touching cross-over points.

2. The composite of claim 1 wherein said composite is a carpet underpad.

3. The carpet underpad of claim 2 wherein said nylon filaments being free of surface coatings.

4. The carpet underpad of claim 3 wherein said elastomer is selected from the group of natural or synthetic rubber.

5. The carpet underpad of claim 4 wherein said elastomer is comprised of a styrene-butadiene copolymer.

6. The carpet underpad of claim 4 wherein said elastomer lamina is comprised of a multiplicity of formed bulges.

7. The carpet underpad of claim 6 wherein said fabric lamina contacts and is bonded to said elastomer lamina only along the peaks of said bulges.

8. The carpet underpad of claim 7 wherein the bond strengths between said elastomer lamina peaks and said fabric lamina is greater than the internal cohesiveness of said elastomer.

9. The carpet underpad of claim 8 wherein said fabric lamina has a weight being less than 1.0 oz./yd.$^2$.

10. The carpet underpad of claim 8 wherein said fabric lamina is embedded in said elastomeric lamina to a fabric depth being less than the fabric thickness.

References Cited

UNITED STATES PATENTS

| 2,740,739 | 4/1956 | Harwin et al. | 161—74 |
| 3,395,060 | 7/1968 | Guldner | 161—150 |
| 3,410,748 | 11/1968 | Blue | 161—159 |
| 3,441,464 | 4/1969 | Blue | 161—67 |
| 3,455,772 | 7/1969 | Mason et al. | 161—122 |
| 3,532,588 | 10/1970 | Newman | 161—148 |

MORRIS SUSSMAN, Primary Examiner

U.S. Cl. X.R.

161—148, 150, 159